(12) United States Patent
Nagy et al.

(10) Patent No.: US 8,517,690 B2
(45) Date of Patent: Aug. 27, 2013

(54) DOUBLE LEADING EDGE AIRFOIL FOR WIND TURBINE BLADE ROOT

(75) Inventors: Gideon Nagy, Madrid (ES); Ignacio Romero Sanz, Madrid (ES); Mario Jimenez De Lago, Madrid (ES)

(73) Assignee: Gamesa Innovation & Technology, S.L., Sarriguren (Navarra) (ES)

( * ) Notice: Subject to any disclaimer, the term of this patent is extended or adjusted under 35 U.S.C. 154(b) by 559 days.

(21) Appl. No.: 12/744,814

(22) PCT Filed: Nov. 10, 2008

(86) PCT No.: PCT/ES2008/070204
§ 371 (c)(1),
(2), (4) Date: May 26, 2010

(87) PCT Pub. No.: WO2009/068719
PCT Pub. Date: Jun. 4, 2009

(65) Prior Publication Data
US 2010/0303632 A1    Dec. 2, 2010

(30) Foreign Application Priority Data
Nov. 28, 2007  (ES) .................................. 200703158

(51) Int. Cl.
*B63H 1/26*  (2006.01)
(52) U.S. Cl.
USPC .......................................... 416/242; 416/243

(58) Field of Classification Search
USPC ...................................... 416/241 R, 242, 243
See application file for complete search history.

(56) References Cited

U.S. PATENT DOCUMENTS

| 4,773,825 A | 9/1988 | Rodde et al. |
| 5,562,420 A * | 10/1996 | Tangler et al. ............ 416/223 R |
| 6,503,058 B1 * | 1/2003 | Selig et al. ................ 416/223 R |
| 2003/0077178 A1 | 4/2003 | Stearns et al. |
| 2006/0099076 A1 | 5/2006 | Wobben et al. |
| 2007/0217917 A1 | 9/2007 | Khan et al. |

FOREIGN PATENT DOCUMENTS
NZ           536428 A       8/2007

* cited by examiner

*Primary Examiner* — Edward Look
*Assistant Examiner* — Juan G Flores
(74) *Attorney, Agent, or Firm* — Ladas & Parry LLP

(57) ABSTRACT

The invention relates to an aerodynamic profile for the root of a wind turbine blade having a double leading edge, including a leading edge (13), a trailing edge (15) and suction and pressure sides (17, 19) between the leading edge (13) and the trailing edge (15). The profile (5, 5', 5') has a relative thickness in the 30%-50% range in at least one section (37) of the root region (31). In addition, the convex portion (21) of the pressure side (19) is configured such that the curvature thereof decreases from a value C0 at the leading edge (13) to a value C1 at a first point P1 and subsequently increases to a value C2 at a second point P2, after which it decreases to a value 0 at the end of the convex portion (21).

5 Claims, 3 Drawing Sheets

DOUBLE LEADING EDGE AIRFOIL FOR WIND TURBINE BLADE ROOT

FIELD OF THE INVENTION

The invention relates to an aerodynamically optimised wind turbine blade and in particular to an optimised wind turbine blade in the root region.

BACKGROUND

The airfoils or profiles used in wind turbine blades have different performance characteristics in the root region, the mid-span region and the tip region.

Wind turbine blades have generally in the root region profiles of higher relative thickness than in the rest of the blade. An example of a root region profile having a relative thickness in the range 24%-26% is disclosed in EP 0 663 527 A1.

A profile in the root region of the blade is desired to have a high maximum lift coefficient and a high lift-to-drag ratio close to the maximum lift coefficient to aid rotor start-up and energy production at medium wind speeds. However, the value of the lift coefficient is usually moderate in this type of profiles and occurs at moderate low angles of attack. These effects result on the necessity of constructing the root area with high chords and high torsion (or twist) in order to obtain the maximum energy. However the manufacturing process is limited to certain values in chords and twist, so values for these variables are therefore restricted in order to optimize overall costs.

It is also desirable that those profiles be less sensitive to soiling and roughness effects, avoiding as much as possible losses of lift when external particles (for example due to ice or dirtiness) are deposited on the external surface, so they should be ideally designed for inducing a transition from laminar to turbulent flow near the leading edge.

In this respect, the paper AIAA-2003-0350, "Roughness Sensitivity considerations for tic root blade airfoils", suggest the DU family of airfoils, having a relative high thickness to deal with the roughness sensitivity problems.

None of known designs produces fully satisfactory results, therefore a continuing need exists for wind turbine blades with an aerodynamic optimised profile in the root region.

SUMMARY OF THE INVENTION

An object of the present invention is to provide a wind turbine blade having a profile in the root region which improves the performance of the wind turbine blade.

Another object of the present invention is to provide a wind turbine blade having a profile in the root region of higher lift coefficient at significant high angles of attack and less sensitivity to soiling conditions than traditional high relative thickness profiles.

Another object of the present invention is to provide a wind turbine blade having an aerodynamically optimized profile in the root region allowing a cost-efficient manufacturing process.

This and other objects of the present invention are met by providing a wind turbine blade having an aerodynamic profile with a leading edge, a trailing edge and suction and pressure sides between the leading edge and the trailing edge, where the pressure side has a first convex part and a second concave part, having said profile in at least a section of the root region of the blade a relative thickness in the range of 30%-50% and having being shaped the convex part of the pressure side so that its curvature decreases from a value C0 in the leading edge to a value C1 in a first point P1, then increases up to a value C2 in a second point P2 and then decreases up to a 0 value at the end of the convex part.

Other features and advantages of the present invention will be understood from the following detailed description in relation with the enclosed drawings.

DETAILED DESCRIPTION OF PREFERRED EMBODIMENTS

Figure 1:
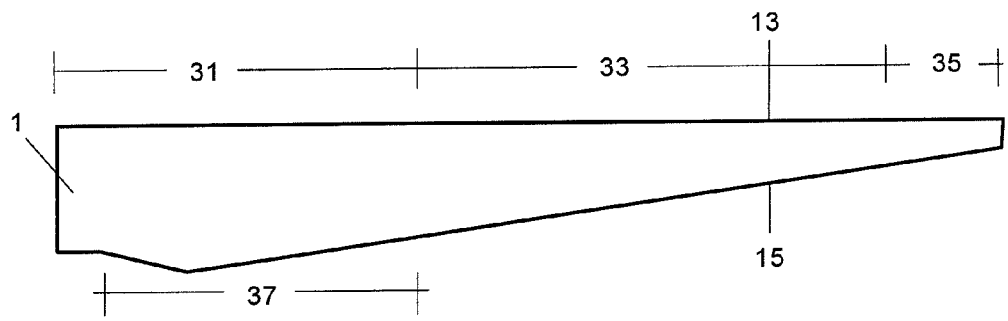
FIG. 1 is a schematic plan view of a typical wind turbine blade.

As it can be seen in FIG. 1 a typical wind turbine blade 1 has three regions: the root region 31 which includes the portion of the blade 1 that is close to the rotor hub, the tip region 35 which includes the portion of the blade 1 that is most distant from the rotor hub, and the mid-span region 33 between the root region 31 and the tip region 35.

The length of the root region 31 is approximately 10%-50% of the blade length. The length of the mid-span region 33 is approximately 80%-40% of the blade length. The length of the tip region 35 is approximately 10% of the blade length.

The shape, contour and length of the blades of a wind turbine determine, in large part, the efficiency and power production capabilities of the wind turbine. As it is well known the rotor hub is mounted on a rotatable shaft connected either directly or through a gearbox to drive an electric generator located in a nacelle for generating electric energy that can be transmitted to an utility grid or to an electric energy storage facility or device.

A cross-section of a wind turbine blade taken perpendicular to the imaginary line connecting the blade's root to the blade's tip is generally referred to as an airfoil or a profile.

An important parameter of a profile is its thickness, i.e. the maximum distance between the suction side and the pressure side that can be expressed as a fraction of the chord length.

An important characteristic of any wind turbine blade is its ability to create lift, which imparts force components to the blades causing its rotation. Since a wind turbine blade is comprised of its multiple profiles, the lift of a turbine blade can be discussed by reference to selected relevant profiles, recognizing that the lift of the entire blade is an integration of the lifts of all the profiles in the blade. The magnitude of a profile lift is dependent on many factors, including the incident air velocity, the shape and contour of the profile and the angle of attack, i.e. the angle between the imaginary straight line or chord line extending from the leading edge to trailing edge and a vector indicative of the speed and direction of the air flow. The lift coefficient of a profile is a convention adopted to represent the profile with a single non-dimensional figure.

Figure 2:
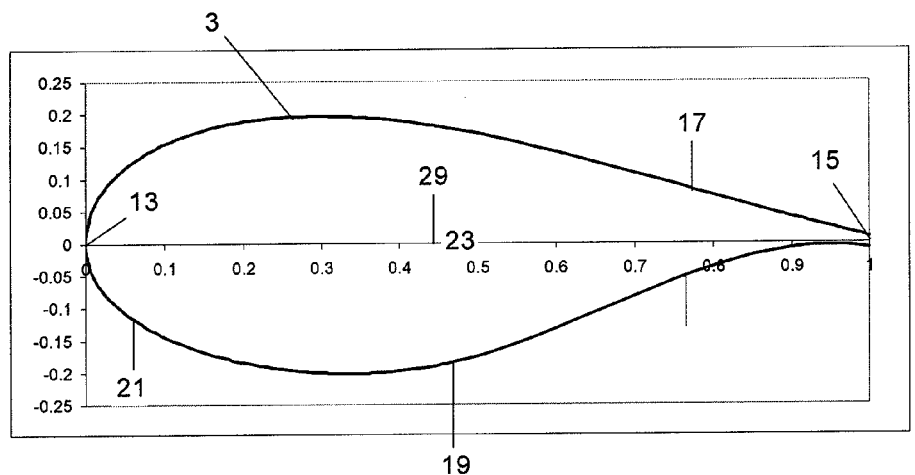
FIG. 2 shows a known profile for the root region of a wind turbine blade.

FIG. 2 shows a typical profile 3 of the root region 31 of a wind turbine blade 1 having a leading edge 13, a moderately blunt trailing edge 15 and a lifting surface with a suction side 17 and a pressure side 19. The chord 29 is an imaginary line drawn between the leading edge 13 and the trailing edge 15.

The shape of said profile can be defined by the (x, y) coordinates of the suction and pressure sides 17, 19 expressed as fractions of the chord length. The profile shown in FIG. 1 is a profile with a high relative thickness.

The pressure distribution in the suction and pressure sides 17, 19, which determines the profile performance, can be seen as dependant function of the curvature distribution of both sides, being defined curvature as the inverse of the radius of curvature in any point along said sides.

Figure 3:
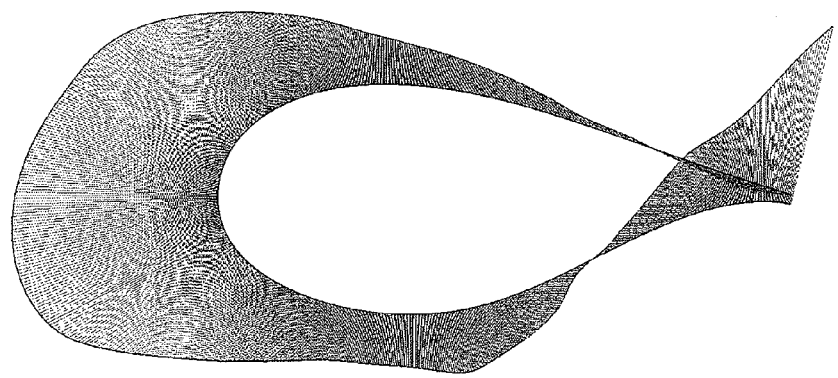
FIG. 3 shows the curvature distribution for the profile shown in FIG. 2.

As it can be seen in FIG. 3, one relevant feature of the shape of the curvature distribution along the profile shown in FIG. 2 is that presents one continuous lobe in the leading edge.

Figure 4:
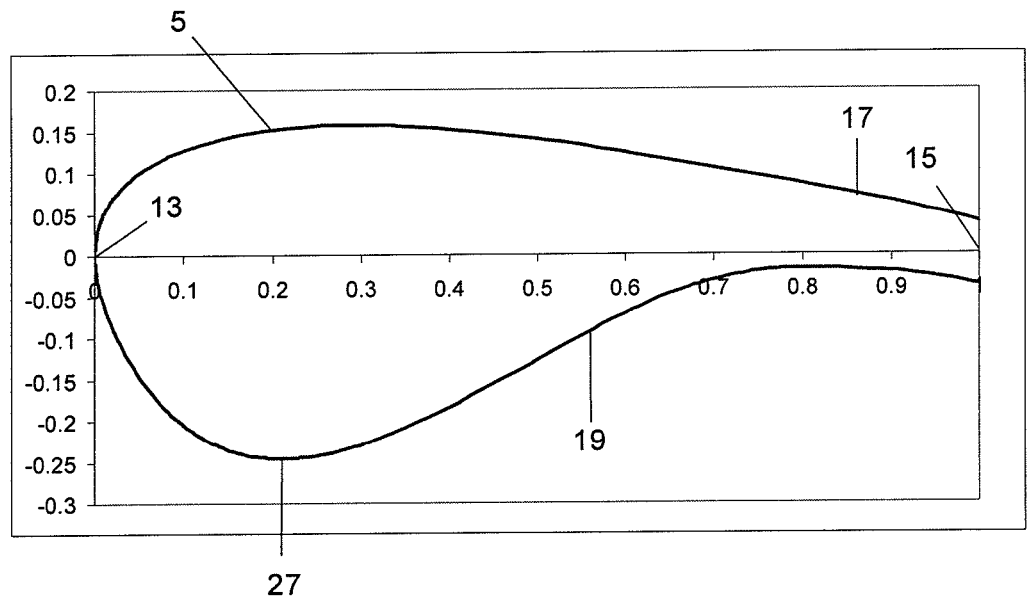
FIGS. 4, 5, 6 show profiles according to the present invention for the root section of a wind turbine blade.
Figure 5:
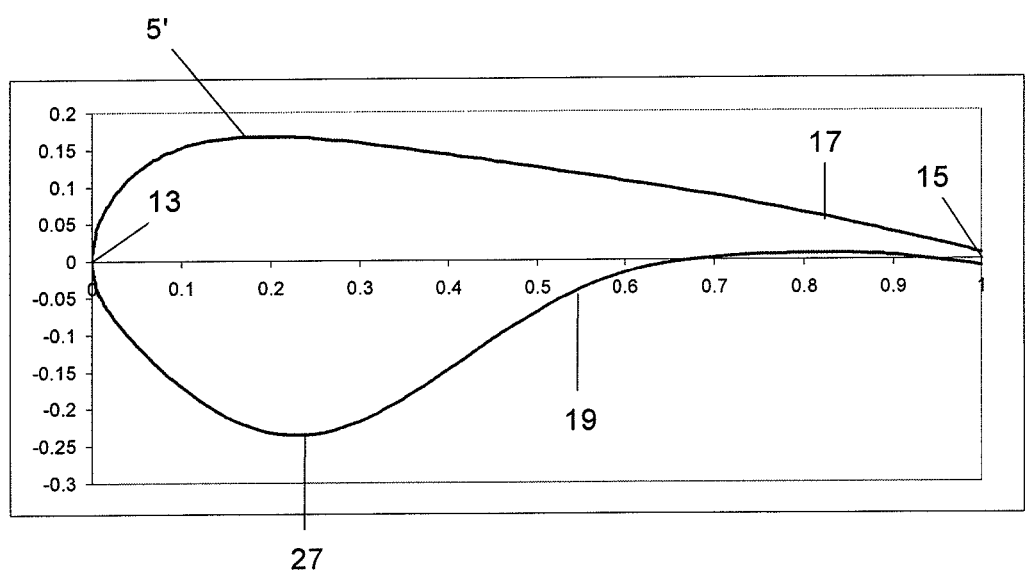
Figure 6:
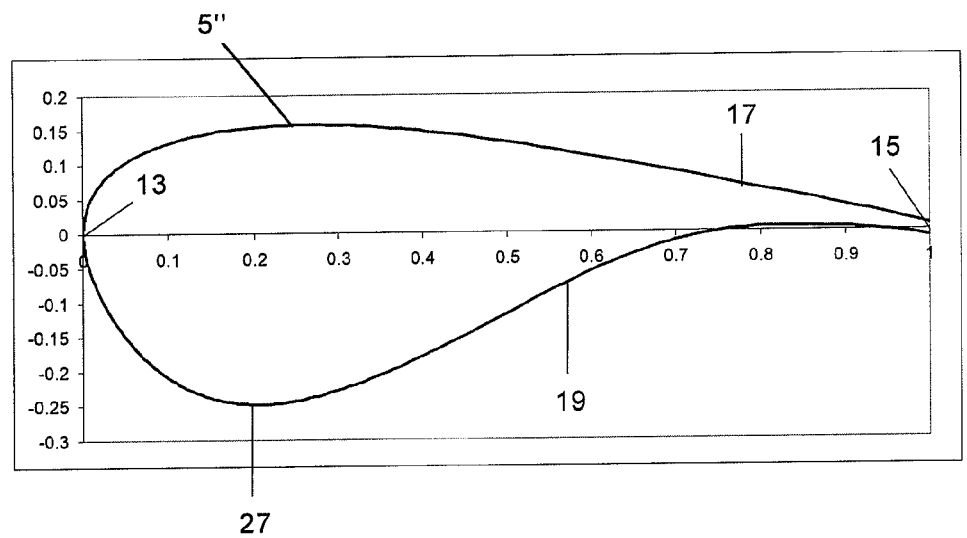

FIGS. 4, 5, 6 show profiles 5, 5', 5" according to this invention for at least a section 37 of the root region 31 having, as the profile 3 shown in FIG. 2, a leading edge 13, a trailing edge 15 and a lifting surface with a suction side 17 and a pressure side 19. The main differences with respect to the profile 3 shown in FIG. 1 are, in the first place, that these profiles have a higher relative thickness (greater or equal than 30% and lower or equal than 50%) and, in the second place, that the pointed zone 27 in the pressure side 19 is shaped in similar manner as the leading edge 13 pointed zone, so that it can be said that the profiles 5, 5', 5" have a "second" leading edge 27, resulting in a "double leading edge" profile. The differences between profiles 5, 5', 5" refer mainly to the shapes of the trailing edge 15 and the "second" leading edge 27.

The length of said section 37 extends between 1%-100% the length of the root region 31.

Figure 7:
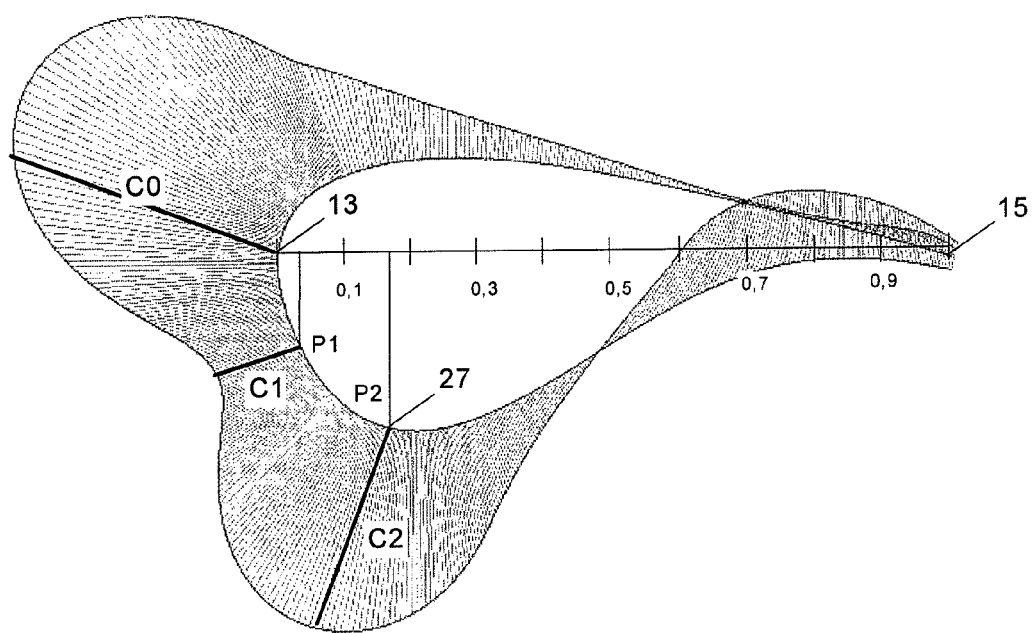
FIG. 7 shows the curvature distribution for a similar profile to those shown in FIGS. 4, 5, 6.

Following FIG. 7, showing a curvature distribution applicable to the is profiles 5, 5', 5" shown in FIGS. 4, 5, 6, it can be seen that the curvature of the pressure side has a maximum value C0 at the starting point P0 in the leading edge 13. Then it decreases continuously up to a value C1 at point P1 corresponding to a chord position at, approximately, 3% the chord length, then increases up to a value C2 at point P2 (the "second" leading edge 27) corresponding to a chord position at, approximately, 17% the chord length, then decreases up to reach a zero value at a point corresponding to a chord position at 49% the chord length, where the shape of the pressure side change from convex to concave. Beyond this point the differences with respect to the typical profiles are less relevant.

In a preferred embodiment P1 is located in a profile section corresponding to a chord position in the range of 1% to 8% the chord length, measured from the leading edge 13.

In a preferred embodiment P2 is located in a profile section corresponding to a chord position in the range of 5% to 40% the chord length, measured from the leading edge 13.

In a preferred embodiment, the curvature value C2 in the "second" leading edge 27 is lesser than the curvature value C0 in the leading edge 13. Preferably the curvature value C2 is comprised between 40-90% the curvature value C0.

Although the present invention has been fully described in connection with preferred embodiments, it is evident that modifications may be introduced within the scope thereof, not considering this as limited by these embodiments, but by the contents of the following claims.

The invention claimed is:

1. A wind turbine blade (1) having an aerodynamic profile with a root region, leading edge (13), a trailing edge (15) and suction and pressure sides (17,19) between the leading edge (13) and the trailing edge (15), the pressure side (19) having a first convex part (21) and a second concave part (23), the convex part (21) of the pressure side (19) being shaped so that its curvature decreases from a value (C0) in the leading edge (13) to a value (C1) in a first point (P1), then increases up to a value (C2) in a second point (P2) and then decreases up to a 0 value at the end of the convex part (21), wherein
   at least a section (37) of the root region (31) has a relative thickness in the range of 30%-50%,
   said first point (P1) is located in a profile section corresponding to a chord position in the range of 1% to 8% of the chord length, measured from the leading edge (13),
   said second point (P2) is located in a profile section corresponding to a chord position in the range of 5% to 40% the chord length, measured from the leading edge (13), and
   the value (C2) of the curvature of the convex part (21) in said second point (P2) is comprised between 40-90% of the value (C0) of the curvature in the leading edge (13).

2. A wind turbine blade (1) according to claim 1, wherein the root region (31) extends between 10%-50% the length of the blade and said section (37) extends between 1%-100% the length of the root region (31).

3. A wind turbine blade (1) according to claim 1, wherein said first point P1 is located in a profile section corresponding to a chord position in the range of approximately 3% the chord length, measured from the leading edge (13).

4. A wind turbine blade (1) according to claim 1, wherein said second point (P2) is located in a profile section corresponding to a chord position in the range of approximately 17% the chord length, measured from the leading edge (13).

5. A wind turbine blade (1) according to claim 1, wherein the value (C2) of the curvature of the convex part (21) in said second point (P2) is comprised between 40-90% of the value (C0) of the curvature in the leading edge (13).

* * * * *